(12) United States Patent
Watanabe et al.

(10) Patent No.: US 8,089,692 B2
(45) Date of Patent: Jan. 3, 2012

(54) PROJECTION TYPE IMAGE DISPLAY APPARATUS

(75) Inventors: Norihiro Watanabe, Tokyo (JP);
Atsushi Michimori, Tokyo (JP); Kazuo Kadowaki, Tokyo (JP); Takumi Kijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 46 days.

(21) Appl. No.: 12/506,883

(22) Filed: Jul. 21, 2009

(65) Prior Publication Data

US 2010/0020395 A1 Jan. 28, 2010

(30) Foreign Application Priority Data

Jul. 23, 2008 (JP) .................................. 2008-189642
Jul. 1, 2009 (JP) .................................. 2009-156779

(51) Int. Cl.
*G03B 21/56* (2006.01)
*G03B 21/00* (2006.01)
*G03B 21/62* (2006.01)
*G03B 21/58* (2006.01)

(52) U.S. Cl. .......... 359/446; 359/443; 359/461; 156/60; 156/91

(58) Field of Classification Search .................. 359/443, 359/446
See application file for complete search history.

(56) References Cited

U.S. PATENT DOCUMENTS

| 7,688,506 | B2 * | 3/2010 | Sugawara et al. | 359/446 |
| 7,880,965 | B2 * | 2/2011 | Michimori et al. | 359/446 |
| 2008/0252968 | A1 * | 10/2008 | Watanabe et al. | 359/446 |
| 2009/0009860 | A1 * | 1/2009 | Marshall | 359/446 |
| 2009/0109530 | A1 * | 4/2009 | Michimori et al. | 359/446 |

FOREIGN PATENT DOCUMENTS

| JP | 55-65940 A | 5/1980 |
| JP | 2007-286346 A | 11/2007 |
| JP | 2007-298945 A | 11/2007 |
| JP | 2007-328002 A | 12/2007 |
| JP | 2008-083687 | * 4/2008 |
| JP | 2008-083687 | * 8/2008 |

* cited by examiner

*Primary Examiner* — Clayton E LaBalle
*Assistant Examiner* — Kevin Butler
(74) *Attorney, Agent, or Firm* — Birch, Stewart, Kolasch & Birch, LLP

(57) ABSTRACT

A projection type image display apparatus includes an optical engine that emits a light according to image signal, a Fresnel lens on which the light emitted by the optical engine is incident and emitting the light as a parallel light, and a diffusion member that diffuses the parallel light emitted by the Fresnel lens. The projection type image display apparatus further includes a driving unit that moves the Fresnel lens or the diffusion member in a plane parallel to an emitting surface of the Fresnel lens or the diffusion member, a frame the supports the Fresnel lens, the diffusion member and the driving unit, a resilient supporting body that supports a weight of the Fresnel lens or the diffusion member with respect to the frame, and a holding unit that holds the Fresnel lens or the diffusion member so as to be movable in the plane parallel to the emitting surface of the Fresnel lens or the diffusion member.

12 Claims, 10 Drawing Sheets

PROJECTION TYPE IMAGE DISPLAY APPARATUS

BACKGROUND OF THE INVENTION

The present invention relates to projection type image display apparatuses, and particularly relates to a technique preventing scintillation by moving a screen of the projection type image display apparatus.

A general projection type image display apparatus such as a rear-projection type television includes a lamp as a light source. Recently, it has been developed to use a laser or the like as the light source, in order to enhance image quality and brightness.

It is known that, when the laser is used as the light source, a speckle pattern is caused by interference of laser lights diffused by a screen. Such a speckle pattern is observed as flicker on the screen. This phenomenon is called as scintillation.

In order to reduce scintillation, there is proposed a method of vibrating the screen in a direction perpendicular to an emitting surface (i.e., a display surface) of the screen, a longitudinal direction of the screen, or a widthwise direction of the screen (see, for example, Patent Document No. 1).

However, when the screen is vibrated in the direction perpendicular to the emitting surface, the display surface is shifted frontward or rearward with respect to a focal position of a projection optical system, and therefore image resolution may be degraded.

Further, when the screen is vibrated in the longitudinal direction or widthwise direction of the screen, the screen moves intermittently (i.e., repeatedly moves and stops). Therefore, a state where strong scintillation is observed (when the screen stops) and a state where substantially no scintillation is observed (when the screen moves) are repeated. In other words, the scintillation becomes alternately stronger and weaker.

Therefore, there is proposed a technique of reducing the scintillation, in which a lenticular lens screen (i.e., a component of the screen) is supported using a resilient body such as a rubber, and the lenticular lens screen is circularly moved in a plane parallel to an emitting surface thereof (see, for example, Patent Document Nos. 2, 3 and 4).

Patent Document No. 1: Japanese Laid-open Patent Publication No. S55-65940 (Pages 4-6, FIGS. 1-2)
Patent Document No. 2: Japanese Laid-open Patent Publication No. 2007-298945 (Pages 5-7, FIG. 2)
Patent Document No. 3: Japanese Laid-open Patent Publication No. 2007-286346 (Page 8, FIG. 4)
Patent Document No. 4: Japanese Laid-open Patent Publication No. 2007-328002 (Page 7, FIG. 5)

In a configuration in which the component (i.e., the lenticular lens screen) of the screen is circularly moved, it is necessary to provide a motor or the like generating a large torque for circularly moving the component of the screen. Therefore, it becomes difficult to reduce size and weight of the projection type image display apparatus. Further, in a configuration in which the component of the screen is held by the resilient body such as rubber, it is difficult to stably support the circular movement of the component.

SUMMARY OF THE INVENTION

The present invention is intended to solve the above described problems, and to provide a projection type image display apparatus capable of preventing scintillation, and capable of reducing size and weight.

According to an aspect of the present invention, there is provided a projection type image display apparatus including an optical engine that emits a light according to image signal, a Fresnel lens on which the light emitted by the optical engine is incident and emitting the light as a parallel light, a diffusion member that diffuses the parallel light emitted by the Fresnel lens, a driving unit that moves the Fresnel lens or the diffusion member in a plane parallel to an emitting surface of the Fresnel lens or the diffusion member, a frame the supports the Fresnel lens, the diffusion member and the driving unit, a resilient supporting body that supports a weight of the Fresnel lens or the diffusion member with respect to the frame, and a holding unit that holds the Fresnel lens or the diffusion member so as to be movable in the plane parallel to the emitting surface of the Fresnel lens or the diffusion member.

With such a configuration, scintillation can be reduced, and a size and weight of the projection type image display device can be reduced.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 1:
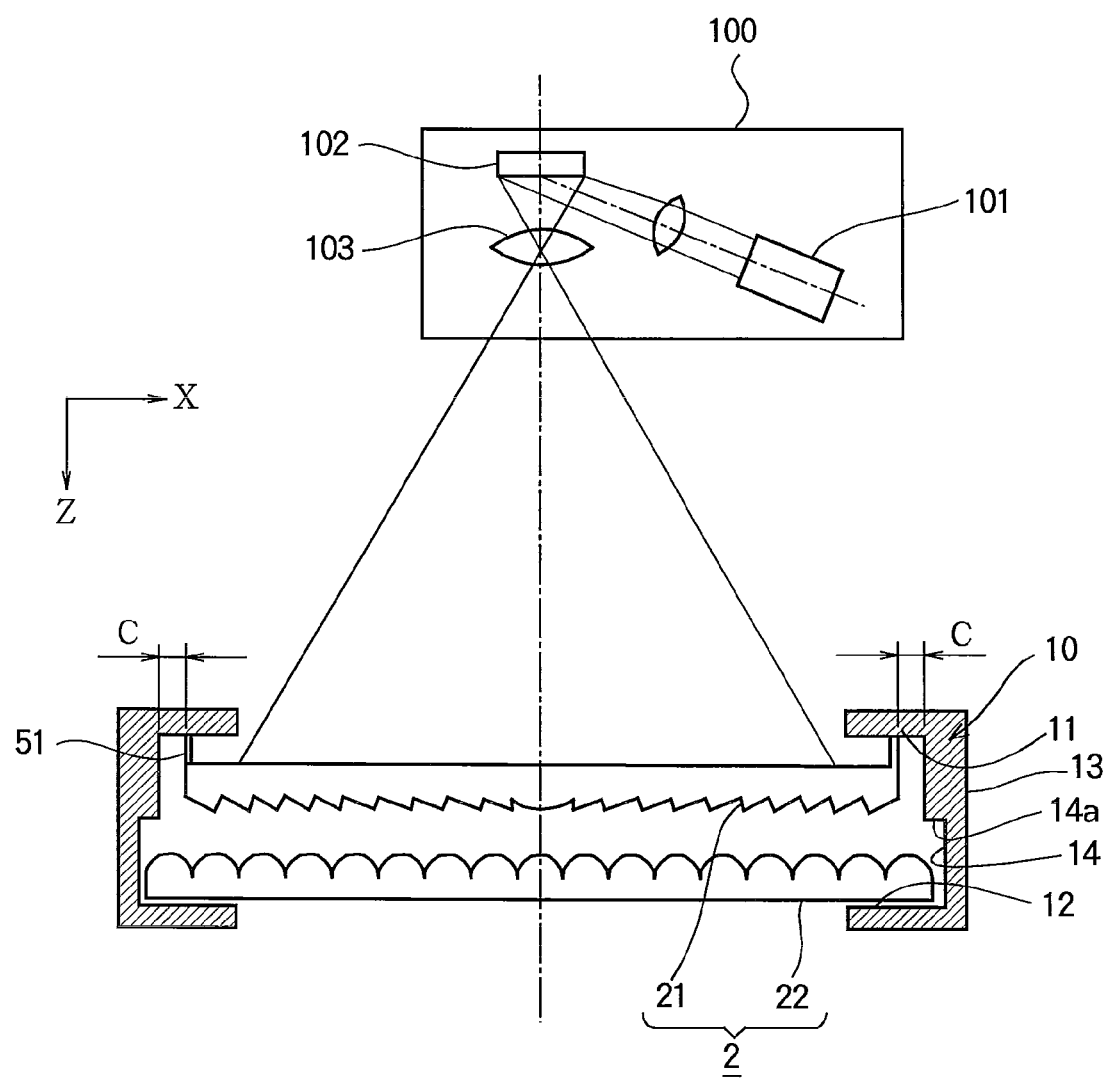
FIG. 1 shows a configuration of a projection type image display device according to Embodiment 1 of the present invention.

FIG. 1 shows a basic configuration of a projection type image display apparatus according to Embodiment 1 of the present invention. As shown in FIG. 1, the projection type image display apparatus is configured as a rear-projection type image display apparatus, and includes a screen unit 200 and an optical engine 100 that projects an image onto the screen unit 200 from a backside of the screen unit 200.

The optical engine 100 includes a laser module 101 as a light source, and a DMD (Digital Micromirror Device) 102 as a spatial modulation element that spatially modulates a light emitted by the laser module 101 according to input signal, and a projection optical system 103 that projects an expanded image onto a screen 2.

The screen unit 200 includes the screen 2 on which a light from the optical engine 100 is incident. The screen 2 includes a Fresnel lens 21 on which the light from the optical engine 100 is incident, and the Fresnel lens 21 emits the light as a parallel light. The screen 2 further includes a lenticular lens screen 22 (i.e., a diffusion member) that diffuses the light emitted from the Fresnel lens 21 and emits the diffused light. The Fresnel lens 21 and the lenticular lens screen 22 are laminated with each other. The lenticular lens screen 22 includes a lenticular lens sheet, a light-scattering layer, black stripes and the like (not shown) which are laminated. The lenticular lens screen 22 has a larger outside dimension than the Fresnel lens 21.

The Fresnel lens 21 and the lenticular lens screen 22 (that constitute the screen 2) have rectangular shapes. Each of the Fresnel lens 21 and the lenticular lens screen 22 is supported by a frame 10 at four sides. The frame 10 has a substantially rectangular C-shaped cross section, and includes a rear wall portion 11 facing an end portion of an incident surface of the screen 2, a front wall portion 12 facing an end portion of an emitting surface of the screen 2, and a lateral wall portion 13 connecting the rear and front wall portions 11 and 12. A recess portion 14 for holding an end portion of the lenticular lens screen 22 is formed on the front wall portion 12 side of the lateral wall portion 13. The end portion of the lenticular lens screen 22 engages into between the front wall portion 12 and an inner surface 14a (facing the front wall portion 12) of the recess portion 14, and the lenticular lens screen 22 is held by the frame 10.

In FIG. 1, a plane which is parallel to a surface (i.e., a display surface or an emitting surface) of the screen 2 is defined as XY plane, and a direction perpendicular to the surface of the screen 2 is defined as Z direction. Along the Z direction, a direction in which the light from the optical engine 100 proceeds is defined as frontward, and its opposite direction is defined as rearward. On the surface of the screen 2 (i.e., the XY plane), a left-right direction as viewed by an observer is defined as X direction, and a vertical direction as viewed from the observer is defined as Y direction.

The Fresnel lens 21 is held by the frame 10 so that predetermined clearances are formed between the Fresnel lens 21 and the inner surfaces of the lateral wall portion 13 in the X direction and in the Y direction so as to allow the Fresnel lens 21 to move in the XY plane (i.e., a plane parallel to the surface of the screen 2). A supporting manner for supporting the Fresnel lens 21 will be described later.

Figure 2:
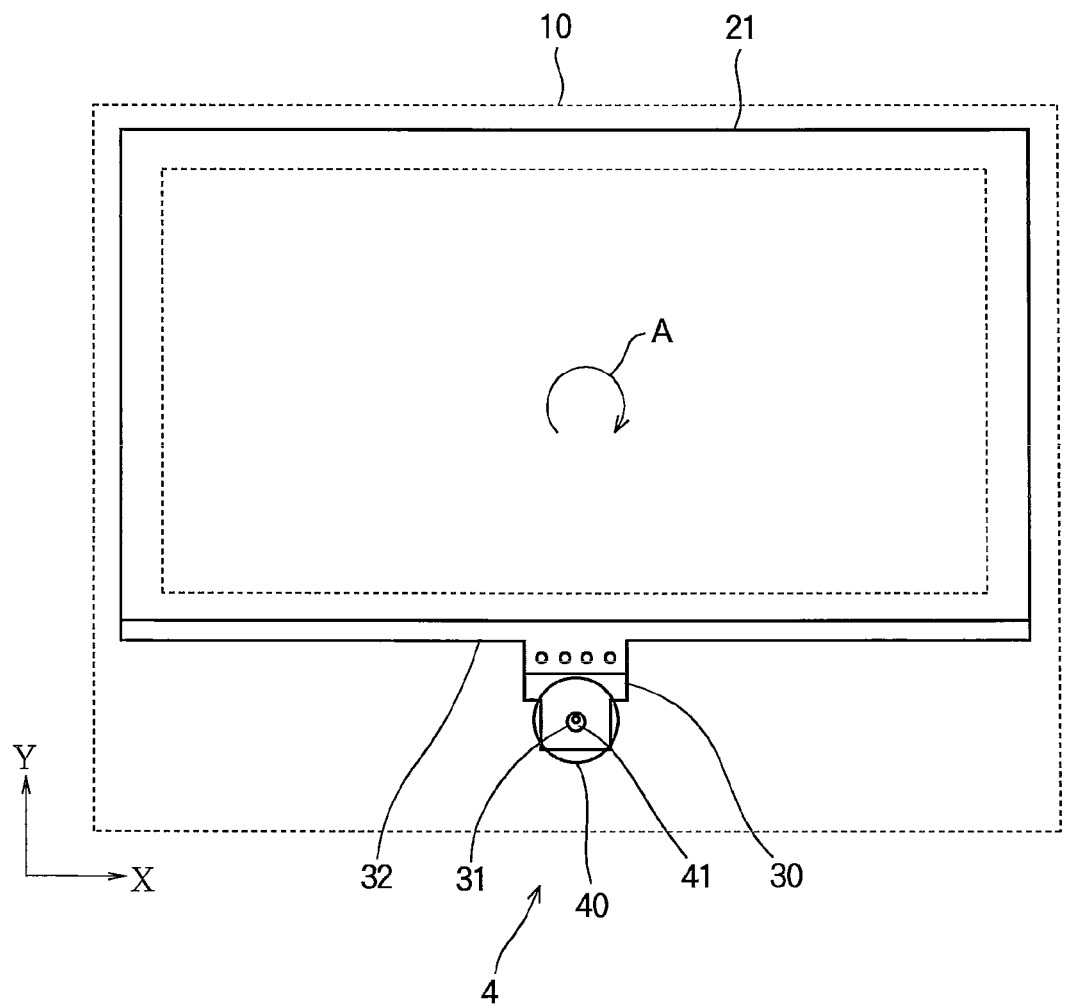
FIG. 2 is a front view of showing a screen of the projection type image display device according to Embodiment 1 of the present invention.

FIG. 2 is a front view of the screen unit 200 of the projection type image display apparatus shown in FIG. 1. A driving mechanism (i.e., a driving unit) 4 is mounted to the frame 10. The driving mechanism 4 includes a motor 40 and a cam 41 driven by the motor 40. The motor 40 is fixed to the frame 10 via a not shown fixing member.

A mount 32 is fixed to a lower end of the Fresnel lens 21 by means of bonding adhesive or the like, and extends along the lower end of the Fresnel lens 21 throughout the width of the Fresnel lens 21. A transmission member 30 is integrally formed with the mount 32 at a center portion in the longitudinal direction (i.e., the X direction) of the mount 32. The transmission member 30 has a hole portion 31 into which the cam 41 is inserted.

Figure 3:
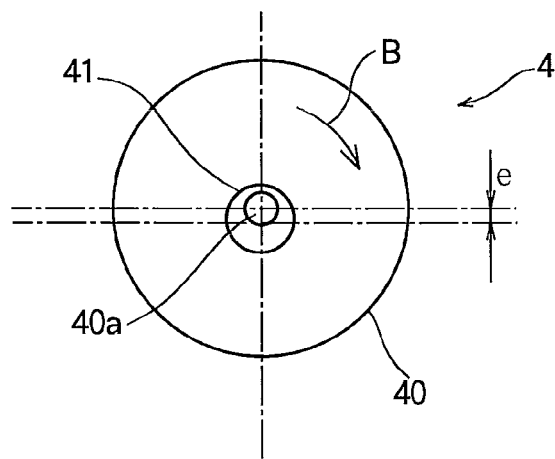
FIG. 3 is a front view of showing a driving mechanism for a Fresnel lens of the projection type image display device according to Embodiment 1 of the present invention.
Figure 4:
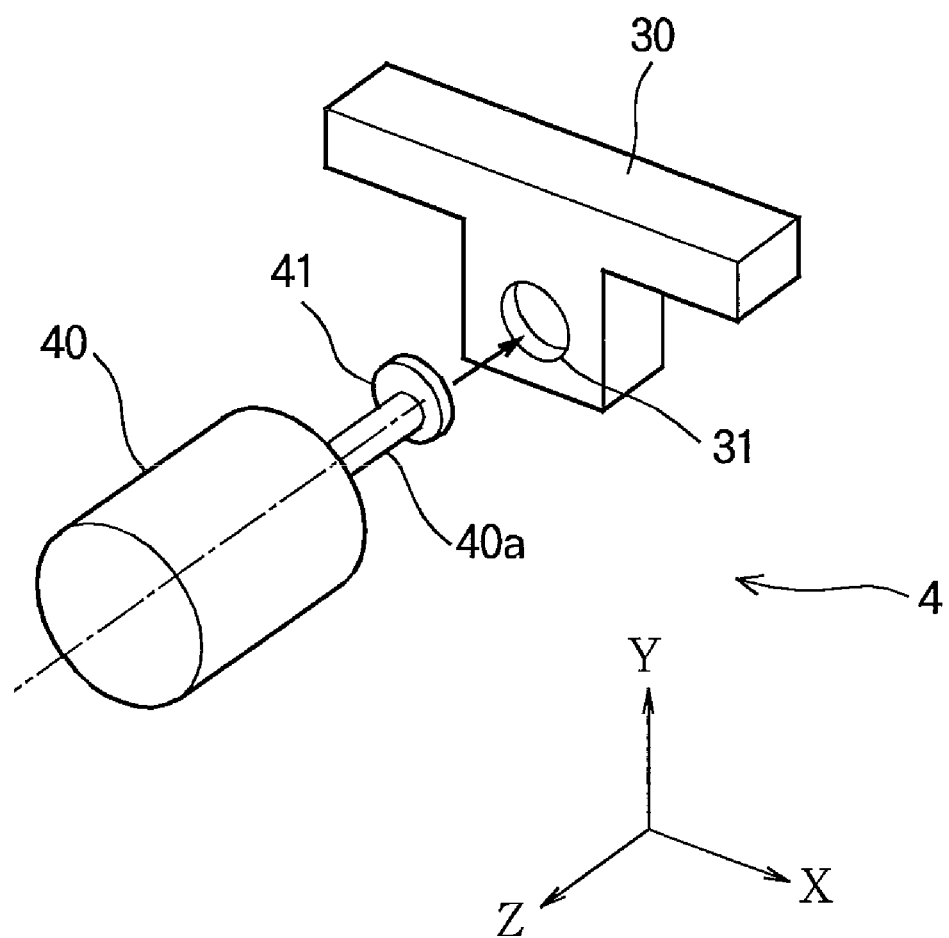
FIG. 4 is a perspective view showing a basic configuration of the driving mechanism shown in FIG. 3.

FIGS. 3 and 4 are a front view and a perspective view showing a basic configuration of the driving mechanism 4. The cam 41 has a cylindrical shape or disk shape, and is mounted to an output shaft 40a of the motor 40 of the driving mechanism 4. The cam 41 has a center which is shifted from a rotation axis (i.e., a center of the output shaft 40a) by a predetermined amount "e". The cam 41 engages the hole portion 31 (having a circular shape) of the transmission member 30 mounted to the lower end of the Fresnel lens 21.

When the motor 40 rotates, the cam 41 moves circularly as shown by an arrow B in FIG. 3. With the circular movement of the cam 41, the Fresnel lens 21 moves continuously and periodically, following a circular track in the XY plane as shown by an arrow A in FIG. 2, due to a sliding engagement between the cam 41 and the hole portion 31 of the transmission member 30. Since the Fresnel lens 21 continuously moves without stopping, it becomes possible to suppress level fluctuation of scintillation (i.e., a fluctuation between when the Fresnel lens moves and when the Fresnel lens stops) that may occur when the Fresnel lens 21 is reciprocated.

According to the projection type image display apparatus of Embodiment 1, the scintillation is reduced by the circular movement of the Fresnel lens 21 in the XY plane. In this regard, if the Fresnel lens 21 moves out of the XY plane, the incident surface of the Fresnel lens 21 is shifted frontward or rearward with respective to a focal position of the projection optical system 103, which causes enlargement and reduction of image. Further, if an inclination of the Fresnel lens 21 occurs, a distortion of image occurs. For these reasons, it is necessary to suppress the movement and inclination of the Fresnel lens 21 out of the XY plane. Further, if a warping of the Fresnel lens 21 occurs due to low rigidity or change in environment, the incident surface of the Fresnel lens 21 may be shifted due to the warping, and may cause a distortion of image. For this reason, it is necessary to suppress the warping of the Fresnel lens 21.

Figure 5:
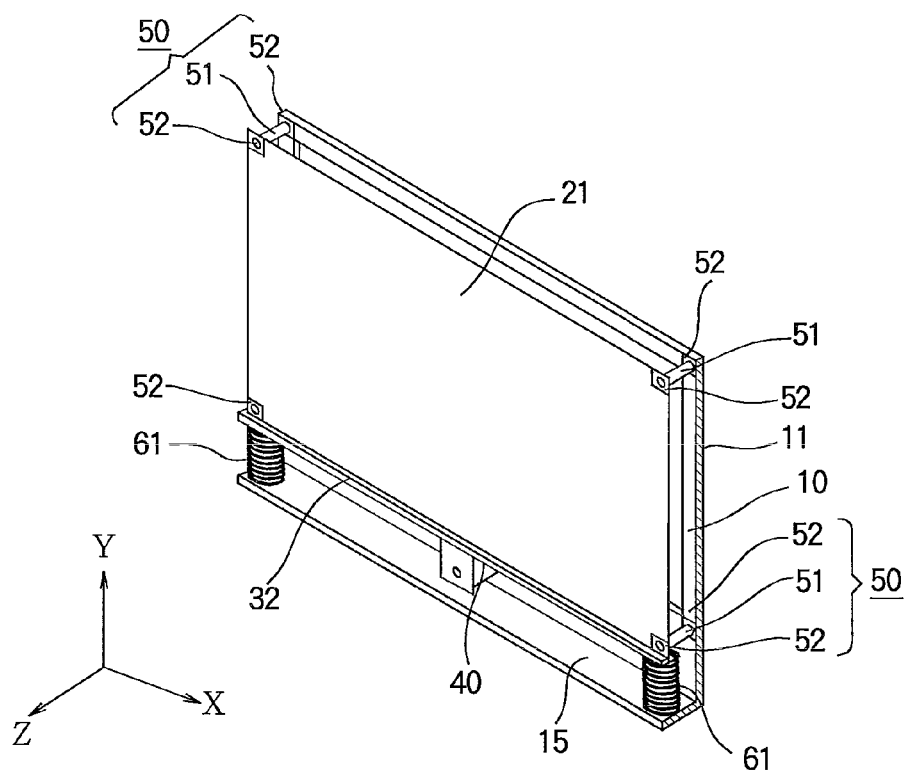
FIG. 5 is a perspective view showing a supporting mechanism for supporting the Fresnel lens according to Embodiment 1 of the present invention.
Figure 6:
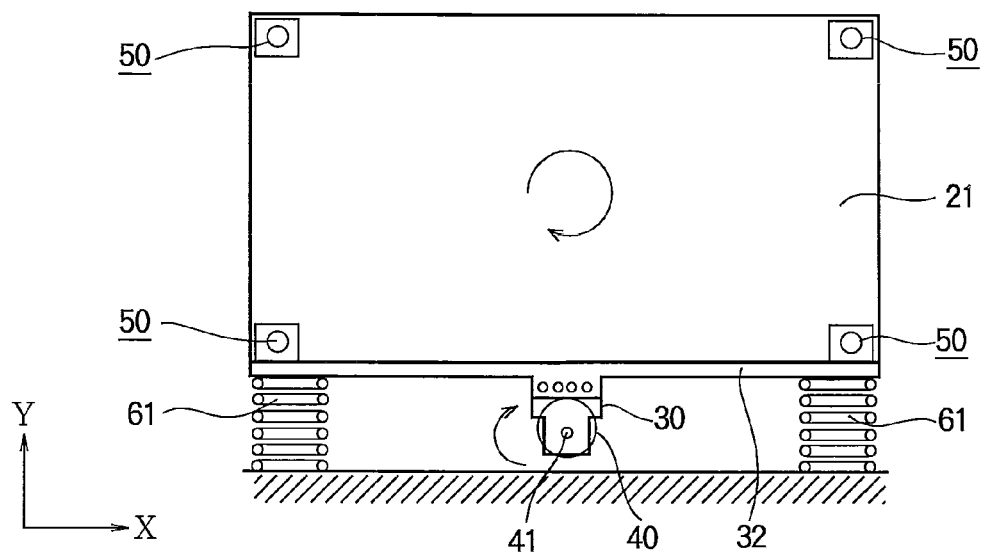
FIG. 6 is a front view showing the supporting mechanism for supporting the Fresnel lens according to Embodiment 1 of the present invention.
Figure 7:
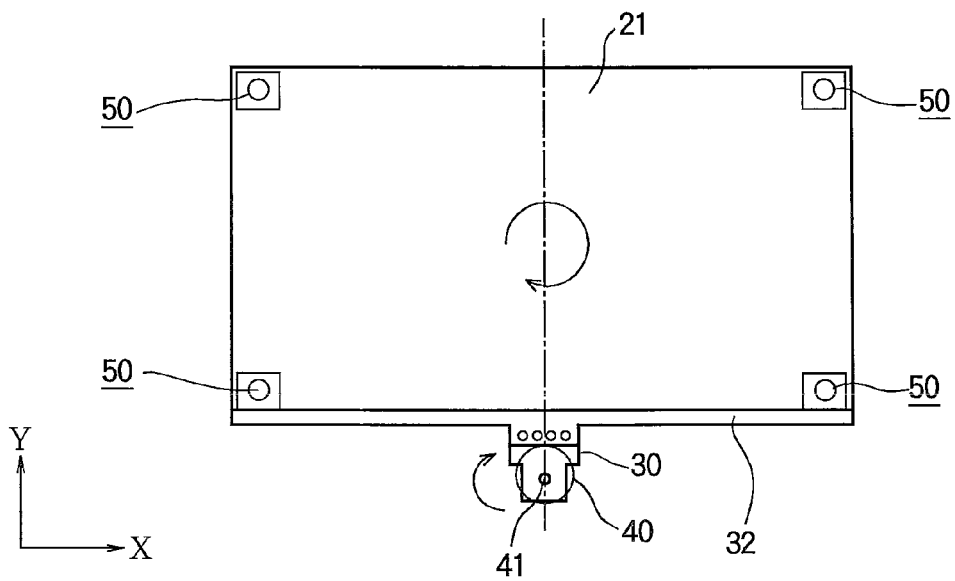
FIG. 7 is a front view showing a comparison example of the supporting mechanism for supporting the Fresnel lens without using spring members.

Next, with reference to FIGS. 5 and 6, a configuration of a supporting mechanism for supporting the Fresnel lens 21 will be described. FIG. 5 is a perspective view showing the supporting mechanism (with spring members) for supporting the Fresnel lens 21. FIG. 6 is a front view showing the supporting mechanism for supporting the Fresnel lens 21. FIG. 7 is a front view showing a comparison example of the supporting mechanism that supports the Fresnel lens 21 without using spring members.

As shown in FIG. 5, four resilient supporting units 50 (i.e., holding units) are disposed on four corners of the Fresnel lens 21. The resilient supporting units 50 are provided between the Fresnel lens 21 and the frame 10. Each resilient supporting unit 50 includes a wire 51 formed of a piano wire (or a piano wire rod) that has rigidity in a longitudinal direction and a resiliency in a bending direction, and a pair of rectangular-parallelepiped block members 52 (i.e., fixing members) integrally formed on both ends of the wire 51. One of the block members 52 of each resilient supporting unit 50 is fixed to the rear wall portion 11 of the frame 10 by means of bonding adhesive or the like, the other block member 52 is fixed to the Fresnel lens 21 by means of bonding adhesive or the like. In this state, the wire 51 is oriented substantially in the Z direction.

As shown in FIG. 6, numerals 61 indicate coil springs as resilient supporting bodies. The coil springs 61 are disposed in the vicinities of left and right ends of a bottom plate 15 of the frame 10. The mount 32 fixed to the lower end of the Fresnel lens 21 is placed on the coil springs 61, so that the Fresnel lens 21 is supported by the coil springs 61. Each of the coil springs 61 has a predetermined spring coefficient k (N/mm). When the Fresnel lens 21 has a weight of mg (N), the coil spring 61 is displaced by mg/(2k) (mm) from an initial length. The coil spring 61 is disposed so that a center of the Fresnel lens 21 becomes a center of the projected image in a state where the displacement of the coil spring 61 is mg/(2k) (mm).

In this state, a load Fm applied to the motor 40 and the cam 41 in the Y direction is expressed as the following equation (1).

$$Fm = mg - 2kx \quad (1)$$

where "Fm" represents a load (N) applied to the motor and cam in the direction perpendicular to the axial direction thereof, "mg" represents a weight (N) of the Fresnel lens, "k" represents a spring coefficient (N/mm) of each coil spring, and "x" represents a displacement (mm) of each coil spring.

"k" and "x" are determined so as to satisfy the following equation (2):

$$mg - 2kx = 0 \quad (2)$$

Two coil springs 61 support the weight of the Fresnel lens 21 as described above. Therefore, in a state where the Fresnel lens 21 is not circularly moved, the load Fm is zero. In other words, the motor 40 and the cam 41 are applied with no load.

In contrast, in a comparative example of the supporting mechanism shown in FIG. 7 that supports the Fresnel lens 21 without using the coil springs, the motor 40 and the cam 41 are applied with the weight of the Fresnel lens 21 even in a state where the Fresnel lens 21 is not circularly moved. In this state, the load applied to the motor 40 and the cam 41 is expressed as the following equation (3):

$$Fm = mg \quad (3)$$

Next, a torque required for circularly moving the Fresnel lens 21 in the cases shown in FIGS. 6 and 7 will be described. In FIG. 6, when the motor 40 rotates, the cam 41 (shifted from the rotation axis of the motor 40 by a predetermined distance "e") pushes the Fresnel lens 21 upward by the distance "e". The displacement of each coil spring 61 decreases by a vertical moving amount (i.e., the distance "e") of the Fresnel lens 21 to become (x−e). A torque Tm required for the motor 40 to circularly move the Fresnel lens 21 is expressed as the following equation (4).

$$Tm = \{mg - 2k(x-e)\}e = 2ke^2 \quad (4)$$

where "Tm" represents a torque (Nm) required for the motor 40 to circularly move the Fresnel lens 21, and "e" represents a radius (mm) of the circular movement of the Fresnel lens 21.

In contrast, in the supporting mechanism shown in FIG. 7 using no spring member, when the motor 40 rotates and the cam 41 (shifted from the rotation axis of the motor 40) pushes the Fresnel lens 21 upward by the distance "e", the weight (mg) of the Fresnel lens 21 is applied to the motor 40, and therefore the torque Tm for the motor 40 to circularly move the Fresnel lens 21 is expressed as the following equation (5).

$$Tm = mge \quad (5)$$

Here, the weight of the Fresnel lens 21 is 50N, the radius of circular movement of the Fresnel lens 21 is 0.2 mm, and the spring coefficient is 2.5 N/mm. In the case where the coil springs 61 are used (FIG. 6), the torque required for the motor 40 to circularly move the Fresnel lens 21 is 0.2 Nmm according to the equation (4). In contrast, in the case where the coil springs 61 are not used (FIG. 7), the torque required for the motor 40 to circularly move the Fresnel lens 21 is 10 Nmm according to the equation (5). As a result, it is understood that, by providing the coil springs 61, the same circular movement of the Fresnel lens 21 can be achieved using a motor with relatively small torque (i.e., relatively compact motor).

In this embodiment, the wires 51 for holding the Fresnel lens 21 are composed of piano wires or other materials which are bendable in the X direction and in the Y direction, and have rigidity in the Z direction (i.e., have large resistance to buckling). Therefore, the Fresnel lens 21 can be circularly moved with a relatively small load, and can be prevented from moving and being inclined out of the XY plane.

Further, even when the Fresnel lens 21 has been warped from an initial state due to low rigidity or has become warped over time due to change in temperature or humidity, the warping of the Fresnel lens 21 can be corrected by the wires 51 with high rigidity in the Z direction, and therefore distortion of image can be suppressed. Accordingly, even when a large-sized plastic screen is used, the distortion of image can be suppressed due to the effect of preventing the movement and inclination of the Fresnel lens 21 out of the XY plane and the effect of correcting the warping of the Fresnel lens 21. As a result, excellent image can be displayed.

As described above, according to Embodiment 1 of the present invention, since the Fresnel lens 21 is continuously moved circularly, the scintillation can be suppressed. Further, since the weight of the Fresnel lens 21 is supported by the coil springs 61, the Fresnel lens 21 can be circularly moved using a relatively compact motor. As a result, it becomes possible to suppress the scintillation, and to reduce the size and weight of the projection type image display apparatus.

Furthermore, since the wires 51 disposed on four corners of the Fresnel lens 21 prevent the movement and inclination of the Fresnel lens 21 out of the XY plane, the distortion of image or decrease in resolution can be prevented. Thus, a high quality image can be displayed.

Although the configuration for circularly moving the Fresnel lens 21 in the XY plane has been described, it is also possible to circularly move the lenticular lens screen 22 (instead of the Fresnel lens 21) in the XY plane. Also in such a case, it is possible to obtain the similar effect in reducing the scintillation.

Moreover, the wires 51 can be disposed on other portions than four corners of the Fresnel lens 21 (or the lenticular lens screen 22). For example, the wires 51 can be disposed on respective sides of the Fresnel lens 21 (or the lenticular lens screen 22) as long as the movement and inclination thereof out of the XY plane can be prevented.

Embodiment 2

Figure 8:
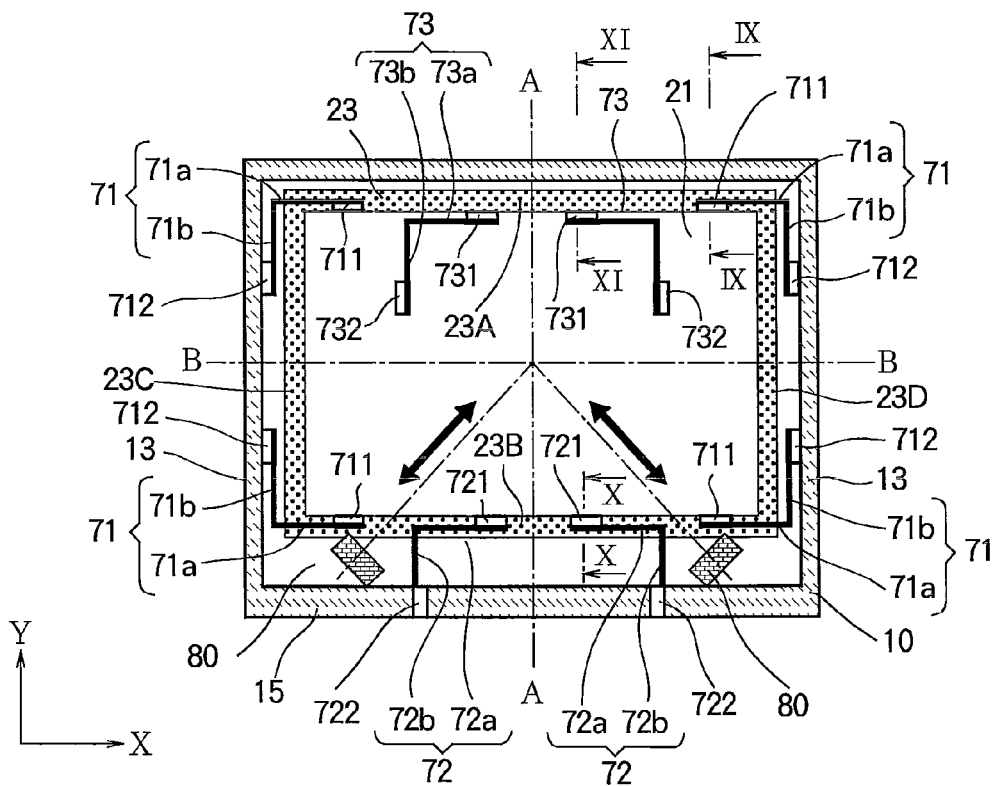
FIG. 8 is a front view showing a supporting mechanism for supporting the Fresnel lens according to Embodiment 2 of the present invention.
Figure 9:
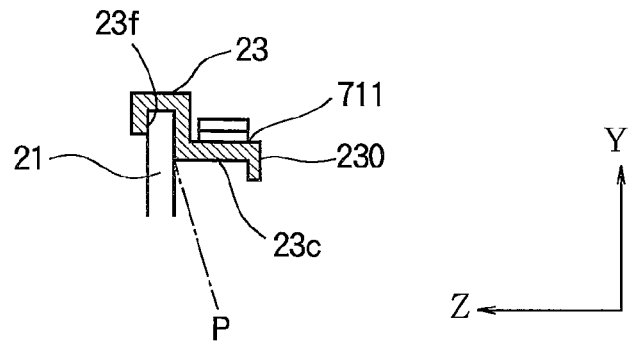
FIG. 9 is a sectional view showing a part of the supporting mechanism for supporting the Fresnel lens according to Embodiment 2 of the present invention.
Figure 10:
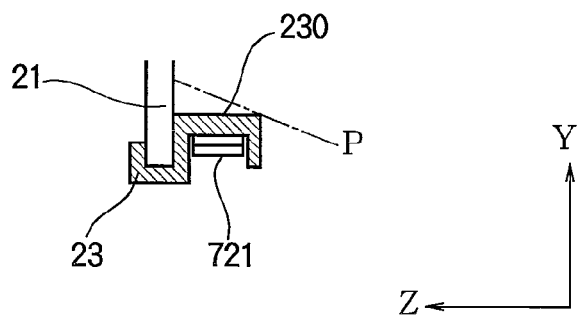
FIG. 10 is a sectional view showing a part of the supporting mechanism for supporting the Fresnel lens according to Embodiment 2 of the present invention.
Figure 11:
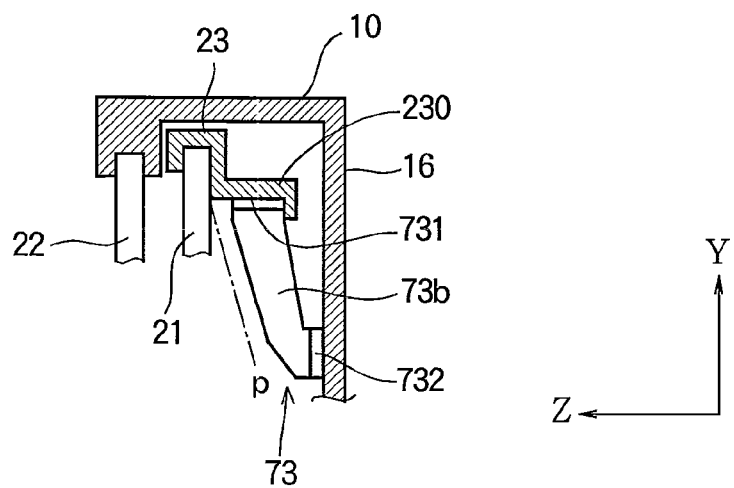
FIG. 11 is a sectional view showing a part of the supporting mechanism for supporting the Fresnel lens according to Embodiment 2 of the present invention.

Next, a configuration of a supporting mechanism for supporting a Fresnel lens of a projection type image display apparatus according to Embodiment 2 will be described. FIG. 8 is a front view showing the supporting mechanism for supporting the Fresnel lens 21 according to Embodiment 2. FIG. 9 is a sectional view taken along line IX-IX in FIG. 8. FIG. 10 is a sectional view taken along line X-X in FIG. 8. FIG. 11 is a sectional view taken along line XI-XI in FIG. 8. In FIGS. 9 and 10, the frame 10 and the lenticular lens screen 22 are omitted.

As shown in FIG. 8, a center line defining a center of the screen 2 (in this example, the Fresnel lens 21) in the X direction is defined as a screen center line A. Another center line defining a center of the screen 2 in the Y direction is defined as a screen center line B.

A lens frame 23 is disposed between the Fresnel lens 21 and the frame 10 that holds four sides of the Fresnel lens 21. The lens frame 23 includes an upper side portion 23A, a lower side portion 23B, and lateral side portions 23C and 23D. The upper side portion 23A, the lower side portion 23B, and side portions 23C and 23D extend along four sides of the Fresnel lens 21. Recess portions 23f (FIG. 9) are formed on respective inner sides of the upper side portion 23A, the lower side portion 23B and the lateral side portions 23C and 23D. The recess portions 23f hold peripheries (an upper side portion, a lower side portion and lateral side portions) of the Fresnel lens 21. The Fresnel lens 21 engages the recess portions 23f of the lens frame 23, and is fixed to the lens frame 23 by means of bonding adhesive or the like. A flange portion 230 (FIG. 9) is formed on an incident side (i.e., the optical engine 100 side) of the lens frame 23. The flange portion 230 protrudes so as not to interfere with an incident light P.

Four first plate springs 71 are formed respectively on four corners of the lens frame 23. Each of the first plate springs 71 has a substantially L-shape, and includes an X direction portion 71a extending in the X direction and a Y direction portion 71b extending in the Y direction.

Among four first plate springs 71, two first plate springs 71 disposed on the upper side portion 23A of the lens frame 23 are disposed in a bilaterally symmetrical manner with respect to the screen center line A. The respective X direction portions 71a extend inwardly in the X direction from the left and right corners of the lens frame 23, and end portions 711 of the X direction portions 71a are fixed to the upper surface of the flange portion 230 (FIG. 9) of the lens frame 23. The respective Y direction portions 71b extends downward along the both lateral sides 23C and 23D, and end portions 712 of the Y direction portions 71b are fixed to the inner surface of the lateral wall portion 13 of the frame 10.

Among four first plate springs 71, two first plate springs 71 disposed on the lower side portion 23B of the lens frame 23 are disposed in a bilaterally symmetrical manner with respect to the screen center line A. The respective X direction portions 71a extend inwardly in the X direction from the left and right corners of the lens frame 23, and end portions 711 of the X direction portions 71a are fixed to the lower surface of the flange portion 230 of the lens frame 23. The respective Y direction portions 71b extends upward along the both lateral sides 23C and 23D, and end portions 712 of the Y direction portions 71b are fixed to the inner surface of the lateral wall portion 13 of the frame 10.

A pair of second plate springs 72 are disposed on the lower side portion 23B of the lens frame 23 in a symmetrical manner with respect to the screen center line A. Each of the second plate spring 72 has a substantially L-shape, and includes an X direction portion 72a extending in the X direction and a Y direction portion 72b extending in the Y direction. The respective X direction portions 72a extend inwardly in the X direction from predetermined positions (respectively defined between the center and either end in the X direction) along the lower side portion 23B of the lens frame 23. End portions 721 of the X direction portions 72a are fixed to the lower surface of the flange portion 230 (FIG. 10) of the lens frame 23. The respective Y direction portions 72b extends downward from the lower side portion 23B of the lens frame 23 toward the bottom plate 15 of the frame 10, and end portions 722 of the Y direction portions 72b are fixed to the bottom plate 15 of the frame 10.

A pair of third plate springs 73 are disposed on the upper side portion 23A of the lens frame 23 in a symmetrical manner with respect to the screen center line A. Each of the third plate spring 73 has a substantially L-shape, and includes an X direction portion 73a extending in the X direction and a Y direction portion 73b extending in the Y direction. The respective X direction portions 73a extend inwardly in the X direction from predetermined positions (respectively defined between the center and either end in the X direction) along the upper side portion 23A of the lens frame 23. End portions 731 of the X direction portions 73a are fixed to the lower surface of the flange portion 230 (FIG. 11) of the lens frame 23. The respective Y direction portions 73b extends downward from the upper side portion 23A of the lens frame 23, and end portions 732 of the X direction portions 73b are fixed to an incident-side wall portion 16 of the frame 10 shown in FIG. 11.

The incident-side wall portion 16 (FIG. 11) of the frame 10 is formed to be parallel to the incident surface of the Fresnel lens 21 and is disposed so as not to interfere with the incident light P from the optical engine 100 (FIG. 1). An extending direction of the Y direction portion 73b of the third plate spring 73 is not a vertical direction, but is inclined toward the optical engine 100 side (referred to −Z direction) with respect to the Y direction. In other words, a fixing portion (i.e., the end portion 731) of the third plate spring 73 fixed to the lens frame 23 and a fixing portion (i.e., the end portion 732) of the third plate spring 73 fixed to the frame 10 are shifted from each other in the Z direction.

The first, second and third plate springs 71, 72 and 73 are configured so that the second plate springs 72 receive a substantially total weight of the Fresnel lens 21. The second plate springs 72 have strengths so as to receive the substantially total weight of the Fresnel lens 21. As shown in FIG. 8, bending angles of the substantially L-shaped first, second and third plate springs 71, 72 and 73 supporting the Fresnel lens 21 are preliminarily set so that the X direction portion and the Y direction portion of each plate spring are at substantially 90 degrees. The first, second and third plate springs 71, 72 and 73 are disposed within a projection plane of the lenticular lens screen 22. In other words, first, second and third plate springs 71, 72 and 73 are disposed overlapping inside the lenticular lens screen 22 in the Z direction.

Voice coil motors 80 are disposed on two positions on the lower side portion 23B of the lens frame 23 in a symmetrical manner with respect to the screen center line A. An end of each voice coil motor 80 is fixed to the lower side portion 23B of the lens frame 23, and the other end of each voice coil motor 80 is fixed to the bottom plate 15 of the frame 10. Each voice coil motor 80 is composed of a linear motor with a movable part that linearly moves, and generates a driving force applied to the lower side portion 23B in the direction shown by arrows in FIG. 8 (i.e., in the direction toward the center of the surface of the Fresnel lens 21). By controlling timings or the like of extension and retraction of the movable parts of the respective voice coil motors 80, the Fresnel lens 21 is circularly moved.

Figure 12:
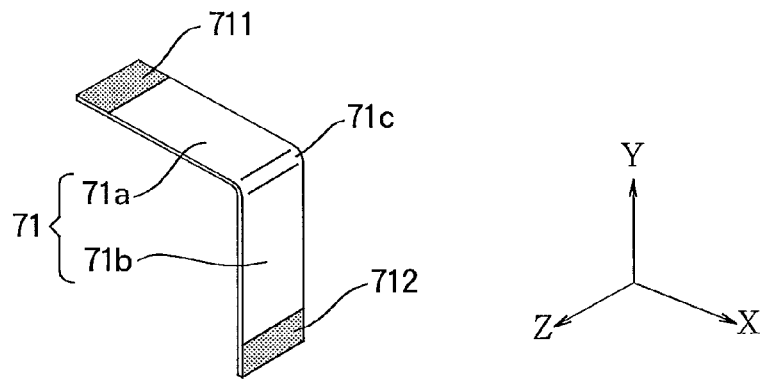
FIG. 12 is a perspective view showing a first plate spring according to Embodiment 2 of the present invention.
Figure 13:
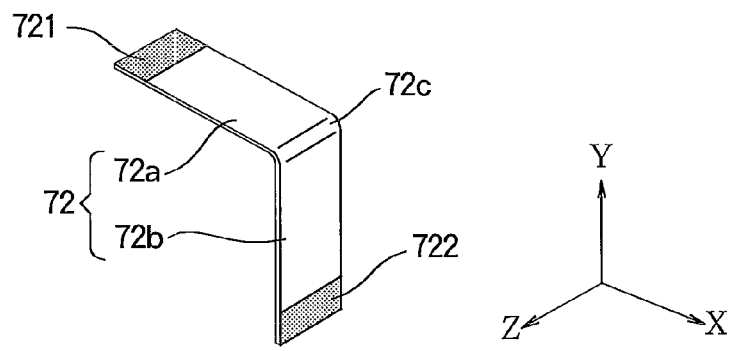
FIG. 13 is a perspective view showing a second plate spring according to Embodiment 2 of the present invention.
Figure 14:
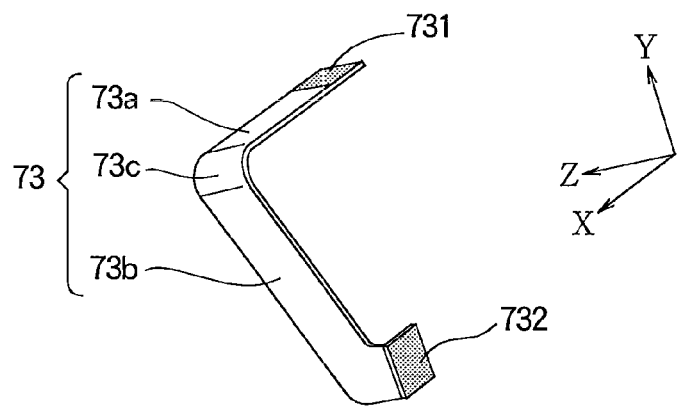
FIG. 14 is a perspective view showing a third plate spring according to Embodiment 2 of the present invention.

FIGS. 12, 13 and 14 are perspective views respectively showing shapes of the first, second and third plate springs 71, 72 and 73. As shown in FIG. 12, the first plate spring 71 has a substantially L-shape, and includes the above described X direction portion 71a, the Y direction portion 71b, and an L-shaped connecting portion 71c connecting the X direction portion 71a and the Y direction portion 71b. The end portion 711 of the X direction portion 71a is fixed to the lens frame 23, and the end portion 712 of the Y direction portion 71b is fixed to the frame 10. The X direction portion 71a has a width in the Z direction, a length in the X direction and a thickness in the Y direction so as to be easily deformable in the Y direction. The Y direction portion 71b has a width in the Z direction, a length in the Y direction and a thickness in the X direction so as to be easily deformable in the X direction.

As shown in FIG. 13, the second plate spring 72 has a substantially L-shape, and includes the above described X direction portion 72a, the Y direction portion 72b, and an L-shaped connecting portion 72c connecting the X direction portion 72a and the Y direction portion 72b. The end portion 721 of the X direction portion 72a is fixed to the lens frame 23, and the end portion 722 of the Y direction portion 72b is fixed to the frame 10. The X direction portion 72a has a width in the Z direction, a length in the X direction and a thickness in the Y direction so as to be easily deformable in the Y direction. The Y direction portion 72b has a width in the Z direction, a length in the Y direction and a thickness in the X direction so as to be easily deformable in the X direction.

Further, the second plate springs 72 are given initial shapes so that only the second plate springs 72 are deformed when the Fresnel lens 21 is disposed at a neutral position (i.e., when the motors 80 are not operated).

As shown in FIG. 14, the third plate spring 73 has a substantially L-shape, and includes the above described X direction portion 73a, the Y direction portion 73b, and an L-shaped connecting portion 73c connecting the X direction portion 73a and the Y direction portion 73b. The end portion 731 of the X direction portion 73a is fixed to the lens frame 23, and the end portion 732 of the Y direction portion 73b is fixed to the frame 10. The Y direction portion 73b extends in a direction at an angle with the Y direction toward −Z side so that the end portion 731 of the X direction portion 73a and the end portion 732 of the Y direction portion 73b are shifted from each other in the Z direction. The X direction portion 73a has a width in the Z direction, a length in the X direction and a thickness in the Y direction so as to be easily deformable in the Y direction. The Y direction portion 73b has a width in the Z direction, a length in the direction at an angle with the Y direction toward −Z side) and a thickness in the X direction so as to be easily deformable in the X direction.

When the Fresnel lens 21 supported by the first, second and third plate springs 71, 72 and 73 is at a neutral position (i.e., a neutral state), the first plate springs 71 and the third plate springs 73 are not deformed, but only the second plate springs 72 are deformed so as to support the weight of the Fresnel lens 21.

Next, an operation of the supporting structure for the Fresnel lens 21 will be described.

Figure 15:
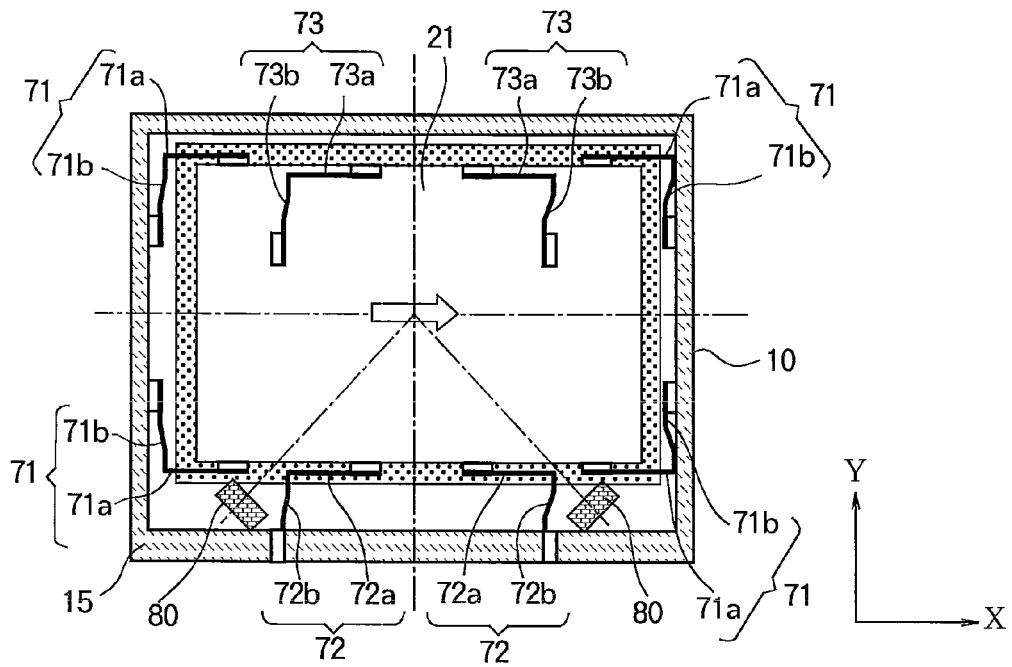
FIG. 15 is a front view showing a state where the Fresnel lens is moved in +X direction according to Embodiment 2 of the present invention.
Figure 16:
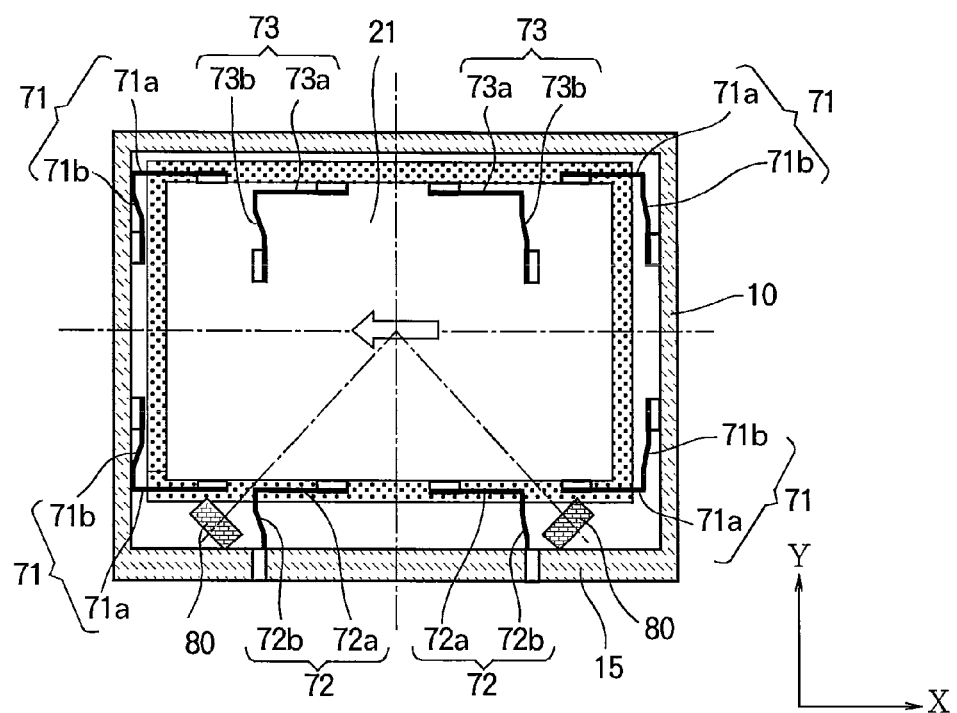
FIG. 16 is a front view showing a state where the Fresnel lens is moved in −X direction according to Embodiment 2 of the present invention.
Figure 17:
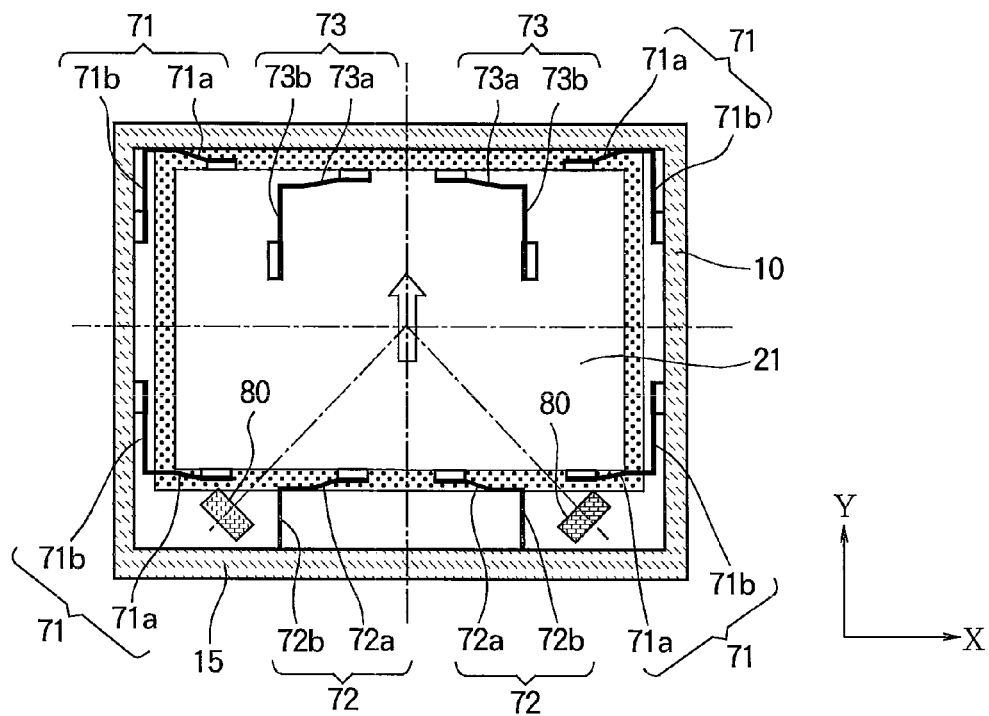
FIG. 17 is a front view showing a state where the Fresnel lens is moved in +Y direction according to Embodiment 2 of the present invention.
Figure 18:
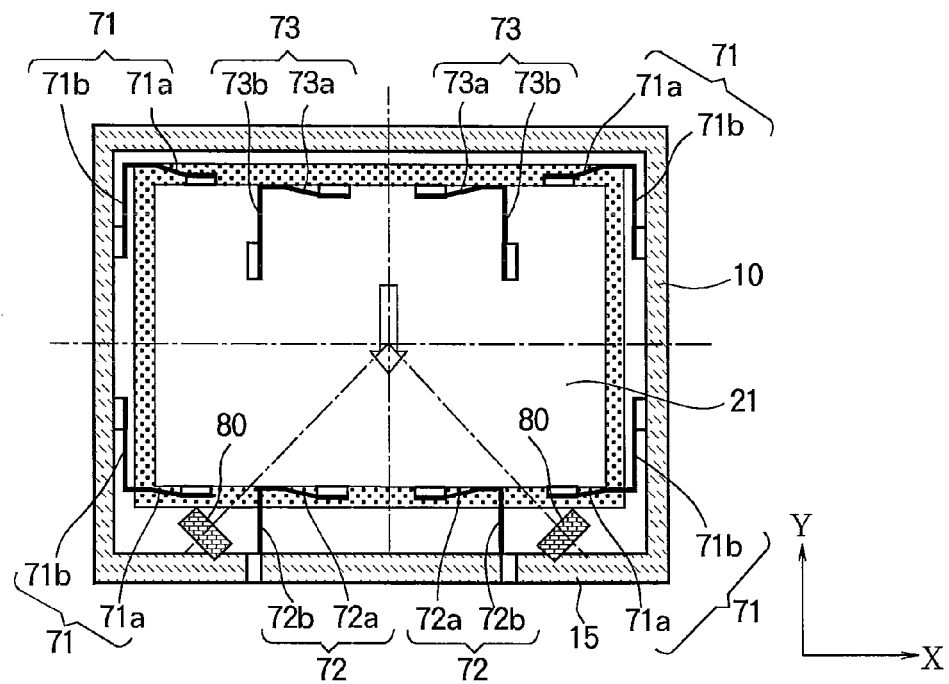
FIG. 18 is a front view showing a state where the Fresnel lens is moved in −Y direction according to Embodiment 2 of the present invention.

The Fresnel lens 21 is held by the above described first, second and third plate springs 71, 72 and 73. As shown in FIGS. 15 and 16, the movement of the Fresnel lens 21 in the X direction is allowed by deformations of the respective Y direction portions 71b, 72b and 73b of the first, second and third plate springs 71, 72 and 73. Further, as shown in FIGS. 17 and 18, the movement of the Fresnel lens 21 in the Y direction is allowed by deformations of the respective X direction portions 71a, 72a and 73a of the first, second and third plate springs 71, 72 and 73. By controlling the left and right voice coil motors 80, the Fresnel lens 21 can be moved circularly in the XY plane with the first, second and third plate springs 71, 72 and 73 being deformed as shown in FIGS. 15 through 18.

Figure 19:
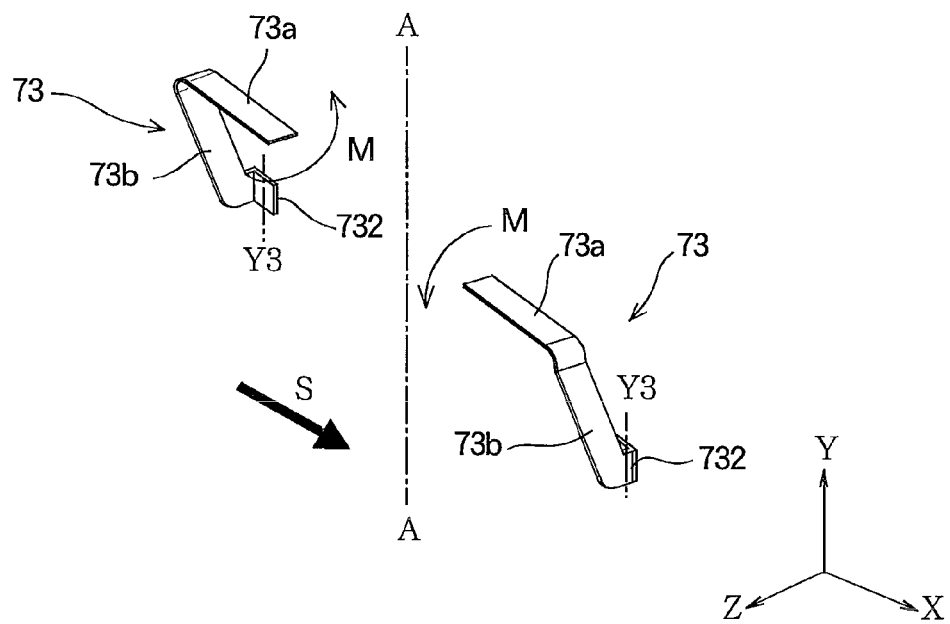
FIG. 19 is a perspective view showing a configuration in which the third plate spring is disposed in a symmetrical manner with respect to a center axis of the Fresnel lens according to Embodiment 2 of the present invention.
Figure 20:
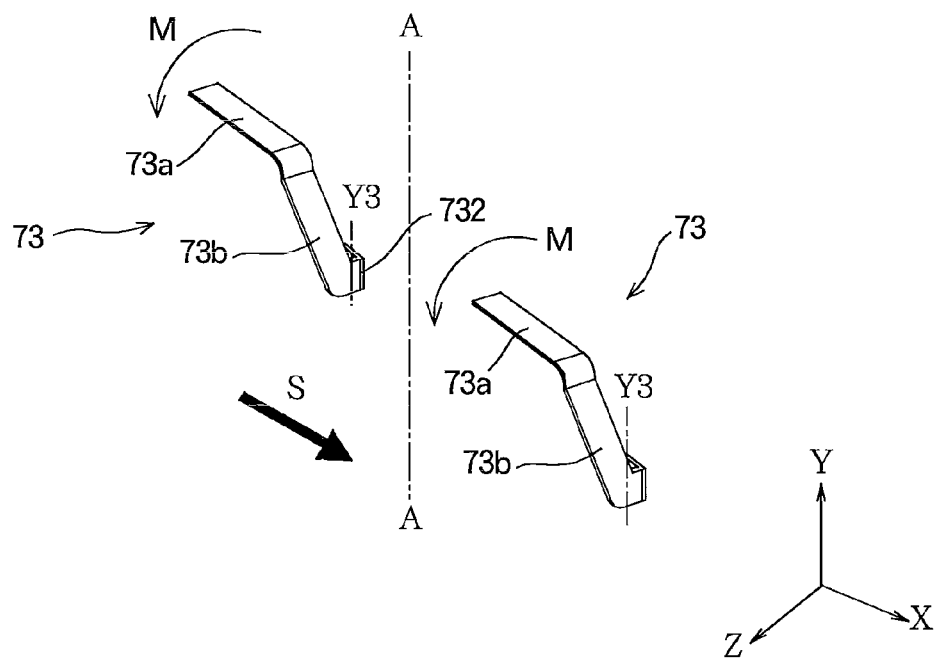
FIG. 20 is a perspective view showing a configuration in which the third plate spring is disposed in an asymmetrical manner with respect to a center axis of the Fresnel lens.

FIG. 19 is a perspective view showing a function of the third plate springs 73 disposed in a bilaterally symmetrical manner with respect to the screen center line A. FIG. 20 is a perspective view showing a function in a case where the third plate springs 73 are disposed in an asymmetrical manner with respect to the screen center line A.

In either configuration shown in FIG. 19 or FIG. 20, the third plate spring 73 is configured so that the end portion 731 (fixed to the lens frame 23) of the X direction portion 73a and the end portion 732 (fixed to the frame 10) of the Y direction portion 73b are shifted from each other in the Z direction. Therefore, when the Fresnel lens 21 is moved in the +X direction (i.e., to the right) as shown by an arrow S, each third plate spring 73 is applied with a moment M about an axis Y3 which penetrates the end portion 732.

In this state, in the configuration shown in FIG. 20, two third plate springs 73 are disposed in an asymmetrical manner with respect to the screen center line A. Therefore, when the Fresnel lens 21 moves in the +X direction, the third plate springs 73 are applied with moments M in the same direction about the axes Y3, which may lead to increased warping of the Fresnel lens 21. In contrast, in the configuration shown in FIG. 19, two third plate springs 73 are disposed in a symmetrical manner with respect to the screen center line A. Therefore, when the Fresnel lens 21 moves in the +X direction, the third plate springs 73 are applied with moments M in opposite directions about the axes Y3. Therefore, the moments M (about the axes Y3) are offset, so that the warping of the Fresnel lens 21 is suppressed.

According to Embodiment 2, the weight of the Fresnel lens 21 is supported by the plate springs (more specifically, the second plate springs 72), and therefore the Fresnel lens 21 can be circularly moved by using the motors with relatively small torque (i.e., compact motors). Therefore, as was described in Embodiment 1, it becomes possible to reduce the scintillation, and to reduce the size and weight of the projection type image display apparatus.

Further, the first, second and third plate springs 71, 72 and 73 include portions (i.e., the X direction portions 71a, 72a and 73a) deformable in the Y direction and portions (i.e., the Y direction portions 71b, 72b and 73b) deformable in the X direction, but do not include portions deformable in the Z direction. In other words, the first, second and third plate springs 71, 72 and 73 are resiliently deformable with respect to the movement in the X direction and in the Y direction, but has high rigidity with respect to the movement in the Z direction. Thus, the movement or inclination of the Fresnel lens 21 out of the XY plane can be prevented, and therefore the scintillation can be reduced without causing distortion of image.

Further, since the first, second and third plate springs 71, 72 and 73 have high rigidity in the Z direction as described above, even when the Fresnel lens 21 has been warped from an initial state (due to, for example, low rigidity), the warping of the Fresnel lens 21 can be corrected due to the high rigidity of the first, second and third plate springs 71, 72 and 73 in the Z direction. Accordingly, even when a large-sized plastic screen is used, the distortion of image can be suppressed by the effect of correcting the warping of the Fresnel lens 21, and excellent image can be displayed.

Furthermore, even when the Fresnel lens 21 has been warped over time due to change in temperature or humidity, the warping of the Fresnel lens 21 can be corrected due to the high rigidity of the first, second and third plate springs 71, 72 and 73 in the Z direction, and distortion of image can be suppressed.

Moreover, since the second plate springs 72 support the weight of the Fresnel lens 21, the first springs 71 and the third plate springs 73 are applied with no load when the Fresnel lens 21 is not moved circularly. Therefore, it is only necessary to design the first springs 71 and the third plate springs 73 so as to withstand deformations in the X direction and in the Y direction during the circular movement of the Fresnel lens 21. The second plate springs 72 (which must be strictly-designed) can be disposed on the lower side portion 21B of the Fresnel lens 21 where degree of freedom of space is high in a television, and limitations in designs of the first and third plate springs 71 and 73 can be reduced (i.e., the plate springs can be thin and compact). Accordingly, the frame 10 can be thin, and flexibility in design increases.

Further, there may be cases where the projection type image display apparatus is used in such a manner that the frame 10 is inclined (for example, when a television display surface is directed relatively upward or downward) In such cases, in a general projection type image display apparatus, a warping of the Fresnel lens may occur due to the inclination of the frame. However, according to Embodiment 2, the warping of the Fresnel lens 21 can be suppressed by the second and third plate springs 72 and 73 which are disposed in the vicinities of the center portion of the Fresnel lens 21 in the longitudinal direction (the X direction).

In addition, since the first, second and third plate springs 71, 72 and 73 are disposed within the projection plane of the lenticular lens screen 22, the movement of the Fresnel lens 21 is not interfered by external factor such as touch by an observer.

Although the configuration for circularly moving the Fresnel lens 21 in the XY plane has been described, it is also possible to circularly move the lenticular lens screen 22 (instead of the Fresnel lens 21) in the XY plane, as in Embodiment 1. Also in such a case, it is possible to obtain the similar effect in reducing the scintillation.

Further, although the Fresnel lens 21 is circularly moved by using the voice coil motors 80 in Embodiment 2, it is also possible to use the cam 41 and the motor 40 as in Embodiment 1.

The present invention is applicable to a projection type image display apparatus for household purpose or business purpose. In this regard, scintillation becomes visible as the screen size increases, and therefore the present invention provide a remarkable effect when applied to a projection type image display apparatus with a large-sized screen.

While the preferred embodiments of the present invention have been illustrated in detail, it should be apparent that modifications and improvements may be made to the invention without departing from the spirit and scope of the invention as described in the following claims.

What is claimed is:

1. A projection type image display apparatus comprising:
   an optical engine that emits a light according to image signal,
   a Fresnel lens on which the light emitted by the optical engine is incident, the Fresnel lens emitting the light as a parallel light,
   a diffusion member that diffuses the parallel light emitted by the Fresnel lens,
   a driving unit that moves the Fresnel lens or the diffusion member in a plane parallel to an emitting surface of the Fresnel lens or the diffusion member,
   a frame the supports the Fresnel lens, the diffusion member and the driving unit,
   a resilient supporting body that supports a weight of the Fresnel lens or the diffusion member with respect to the frame, and
   a holding unit that holds the Fresnel lens or the diffusion member supported by said resilient supporting body so as to be movable in x and y axis directions of the plane parallel to the emitting surface of the Fresnel lens or the diffusion member.

2. The projection type image display apparatus according to claim 1, wherein the resilient supporting body supporting the weight is disposed between a lower side portion of the Fresnel lens or the diffusion member and the frame.

3. The projection type image display apparatus according to claim 1, wherein a plurality of the resilient supporting bodies supporting the weight are disposed on the lower side portion of the Fresnel lens or the diffusion member in a symmetrical manner with respect to a center of the lower side portion.

4. The projection type image display apparatus according to claim 1, wherein the resilient supporting body supporting the weight has higher rigidity against a movement in a direction perpendicular to the emitting surface of the Fresnel lens of the diffusion member than against a movement in a direction parallel to the emitting surface.

5. The projection type image display apparatus according to claim 1, wherein the holding unit is mounted to a peripheral portion of the Fresnel lens or the diffusion member.

6. The projection type image display apparatus according to claim 4, wherein the holding unit is composed of a wire whose axial direction is perpendicular to the emitting surface of the Fresnel lens or the diffusion member.

7. The projection type image display apparatus according to claim 6, wherein a plurality of said wire holding units are disposed on four corners of the Fresnel lens or the diffusion member having a rectangular shape.

8. The projection type image display apparatus according to claim 4, wherein the holding unit resiliently holds the Fresnel lens or the diffusion member, and has higher rigidity against a movement in a direction perpendicular to the emitting surface of the Fresnel lens of the diffusion member than against a movement in a direction parallel to the emitting surface.

9. The projection type image display apparatus according to claim 8, wherein the holding unit includes a plate spring including at least two portions which are deformable in a plane parallel to the emitting surface of the Fresnel lens or the diffusion member.

10. The projection type image display apparatus according to claim 9, wherein a plurality of the plate springs are disposed on four corners of the Fresnel lens or the diffusion member of a rectangular shape.

11. The projection type image display apparatus according to claim 9, wherein a plurality of the plate springs are disposed on a peripheral portion of the Fresnel lens or the diffusion member in a symmetrical manner with respect to a center of the peripheral portion.

12. The projection type image display apparatus according to claim 9, wherein the plate spring is fixed to a lens frame that holds the Fresnel lens or the diffusion member.

* * * * *